Feb. 15, 1927.
H. A. HUMPHREY
1,617,522
CONDUCTING CATALYTIC FLUID REACTIONS
Filed May 1, 1926
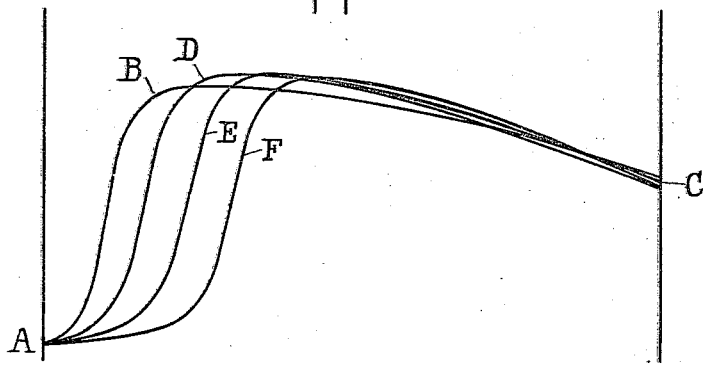
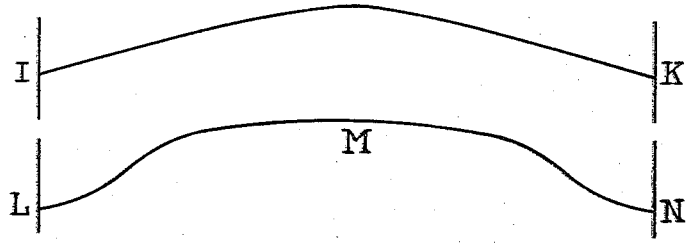
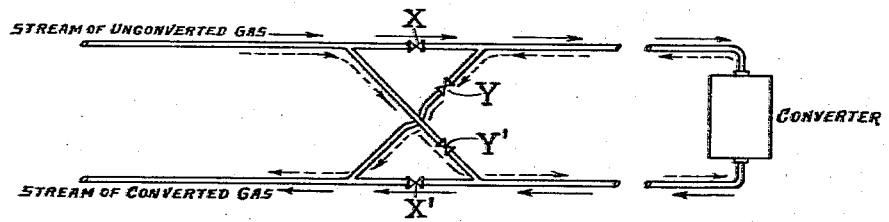
WITNESS
G. V. Rasmussen
INVENTOR
HERBERT A. HUMPHREY
BY
ATTORNEYS Patented Feb. 15, 1927.

1,617,522

UNITED STATES PATENT OFFICE.

HERBERT ALFRED HUMPHREY, OF STOCKTON-ON-TEES, ENGLAND, ASSIGNOR TO ATMOSPHERIC NITROGEN CORPORATION, OF SOLVAY, NEW YORK, A CORPORATION OF NEW YORK.

CONDUCTING CATALYTIC FLUID REACTIONS.

Application filed May 1, 1926, Serial No. 106,127, and in Great Britain May 4, 1925.

This invention relates to the conduct of catalytic fluid reactions and its object is to effect improvements in the process of carrying out such reactions, more particularly gaseous catalytic reactions such as those involved in the production of ammonia from its elements, where a continuously flowing gaseous current is brought in contact with or passed through the contact material, and the gaseous current carries the reacting gases to, and the gaseous product or products of their reaction away from, the contact material.

For such reactions an elevated but controlled or regulated temperature throughout the entire catalyst body is necessary. On the other hand, the reaction itself is accompanied by evolution of heat, the amount of which varies with the intensity of the reaction. These conditions present problems with which this invention deals.

The invention will be described with reference to the accompanying drawings in which Figs. 1 and 2 are graphical representations of temperature curves, while Fig. 3 is a diagrammatic view of the gas flow through a system employing the invention.

The usual procedure for such reactions is to pass the reacting gases, for example nitrogen and hydrogen, continuously in one direction over or through a body of catalytic material, and various cooling and heating means have been proposed or used in the effort to maintain the material at a desired uniform temperature. With such an arrangement, however, it is found that there are considerable temperature differences in the catalyst in the direction of flow of the gases, some parts being much hotter than others. As a rule the resulting temperature gradient throughout the catalyst is of the type illustrated in Fig. 1 of the drawing. The curves ABC, ADC, AEC and AFC represent typical temperature conditions of the catalyst bed, depending on the relative activity or poisoned condition of the first parts of the catalyst. In the first third or half of the catalyst, where most of the reaction occurs, there is a rapid rise in temperature, while in the latter portions, where relatively little reaction occurs, the loss of heat from the system exceeds the heat of reaction, and there is a gradual fall in temperature.

The result is a non-uniform temperature condition which is opposed to maximum catalyst efficiency. Some of the catalyst is either above or below the desired operating temperature. If the attempt is made to lower the temperature of the highest temperature portion by decreasing the temperature of the incoming gas stream, the temperature of the first portions of the catalyst bed will be too low, and if the attempt is made to operate the first portions of the catalyst at the desired temperature, the temperature of the succeeding part of the catalyst bed will be too high.

According to my invention, an improved temperature condition or temperature gradient in the catalyst bed is obtained by periodically reversing the direction of flow of the gases through the catalyst bed. The effect of this procedure is to decrease the temperature range in the catalyst bed and to permit the maintenance of the major portion of the catalyst material at a relatively uniform temperature. The more frequent the reversals i. e. the shorter the periods of gas flow in either direction, the more nearly uniform will the temperature distribution be. In this way temperature curves of symmetrical shape and of less abrupt slope, representing the general average of the conditions throughout the length of the catalyst bed, may be obtained, such as for example, are illustrated as IJK or LMN of Fig. 2 of the drawings, where the peak of the curve is at the intermediate portion. It will be apparent that in obtaining curves of this character the gas is caused to flow through the catalyst in each direction for substantially equal periods of time between reversals. In other words, the periods of flow of the gaseous current in either of its two directions are of equal, though relatively short, duration.

By suitable control of the temperature of the inlet gases to the catalyst, the particular value of the "uniform temperature" resulting from my invention may be varied so that it will be that temperature best suited for any particular combination of catalyst, reacting gases and other operating conditions. Such temperature of the inlet gases may be obtained and controlled satisfactorily by operation of a heat-interchange system for heat-interchange with the outgoing hot gases.

This invention may also be operated in conjunction with other means for temperature control. For example, regulated volumes of fresh relatively cold gas may be introduced into the system at different points or levels in the catalyst bed, thereby increasing or supplementing the control of the temperature throughout the catalyst. By these temperature controlling means, conditions may be established which will yield either of the curves of Fig. 2 or some other curve of the same uniform symmetrical characteristics, or whatever may be the particular curve of that type which represents the desired temperature gradient with respect to the operating conditions prevailing at the plant where the process is practiced.

Any suitable type of catalyst chamber may be employed with means such as valves adapted to allow of periodic reversals of the gas flow, and these means may be manual or automatic. Thus in the diagrammatic illustration of Fig. 3, when valves X, X' are open and valves Y, Y' closed, the flow through the catalyst bed will be in the direction indicated by the solid line arrows, whereas when the valves X, X' are closed and the valves Y, Y' are open, the flow through the catalyst bed will be in the opposite direction as indicated by the dotted line arrows. In the remainder of the apparatus involved in the catalytic operation, the gas flow will, however, remain unaltered.

By my process not only may a more uniform temperature be obtained and maintained throughout the entire catalyst bed, but the value of this uniform temperature may be that of the desired optimum temperature.

My invention furthermore lessens the danger of local overheating of the catalyst and its permanent loss of efficiency by such overheating. It also permits the more efficient use of all portions of the contact mass, so that a smaller amount may be used or increased yields obtained with the same amount.

While the foregoing process has been described in connection with the synthesis of ammonia which is an exothermic catalytic reaction, a corresponding process, when employed in connection with an endothermic catalytic reaction, is intended to be included within the scope of the invention.

I claim:

1. The process of conducting catalytic fluid reactions which involves establishing a flow, containing the fluid reactants in contact with material adapted to catalyze the reaction, in one direction, then discontinuing said flow in said direction, and setting up a flow of said reactants in contact with said catalyst material in the opposite direction, then discontinuing said flow in said direction, and re-establishing the flow in the original direction, and thereafter repeating the aforesaid steps in such manner that the temperature conditions in the catalyst bed are represented by a substantially symmetrical temperature curve.

2. The process as set forth in claim 1 in which the greater part of the catalyst bed is maintained at an equable optimum temperature by suitably controlling the inlet temperature of the reaction fluids.

3. The process as set forth in claim 1 in which ammonia is catalytically synthesized from nitrogen and hydrogen with successive reversals of flow, for the purpose described.

4. In the art pertaining to the conduct of catalytic gaseous reactions in which the reaction gas is caused to pass in contact with catalyst material and the reaction causes the production of thermal variations, that improvement which consists in successively and after substantially equal periods of time reversing the direction of the flow of the gaseous current undergoing reaction by contact with the catalyst and thereby maintaining such temperature conditions in the catalyst bed as are represented by a substantially symmetrical temperature curve having its peak at the intermediate portion of said curve.

5. In the art pertaining to the conduct of catalytic gaseous reactions in which the reaction gas is caused to pass in contact with catalyst material and the reaction causes the production of thermal variations, that improvement which consists in reducing the temperature range prevailing throughout the catalyst bed by alternations of the flow of the gaseous current undergoing reaction by contact with the catalyst the periods of flow in either of its two directions being of relatively short and equal duration.

6. In the art pertaining to the conduct of catalytic gaseous reactions in which the reaction gas is caused to pass in contact with catalyst material and the reaction causes the production of thermal variations, that improvement which consists in reducing the temperature range prevailing throughout the catalyst bed by alternations of the flow of the gaseous current undergoing reaction by contact with the catalyst in such manner that the temperature conditions in the catalyst bed are represented by a substantially symmetrical temperature curve, and establishing and subsequently maintaining selected temperature values for the said reduced temperature range by controlling the inlet temperature of the reaction gas.

In testimony whereof I have hereunto set my hand.

HERBERT ALFRED HUMPHREY.